United States Patent [19]

Tanibata

[11] Patent Number: 5,488,450
[45] Date of Patent: Jan. 30, 1996

[54] IMAGE PRINTER

[75] Inventor: Toru Tanibata, Wakayama, Japan

[73] Assignee: Noritsu Koki, Co., Japan

[21] Appl. No.: 214,612

[22] Filed: Mar. 17, 1994

[30] Foreign Application Priority Data

Mar. 18, 1993 [JP] Japan .................................. 5-057642
Jun. 11, 1993 [JP] Japan .................................. 5-140249

[51] Int. Cl.⁶ .................................................. G03B 27/72
[52] U.S. Cl. .................................. 355/38; 355/41; 355/68
[58] Field of Search ................................ 355/38, 41, 68, 355/70, 71

[56] References Cited

U.S. PATENT DOCUMENTS

| | | | |
|---|---|---|---|
| 4,236,223 | 11/1980 | Stanly et al. | 364/710 |
| 4,429,369 | 1/1984 | Stanly et al. | 364/710 |
| 4,590,492 | 5/1986 | Meier | 346 X/107 |
| 4,942,424 | 7/1990 | Terashita et al. | 355/38 |
| 5,023,652 | 6/1991 | Purro | 355/68 |
| 5,075,716 | 12/1991 | Jehan et al. | 355 X/38 |
| 5,157,482 | 10/1992 | Cosgrove | 355 X/4 |
| 5,184,227 | 2/1993 | Foley | 358/302 |
| 5,253,011 | 10/1993 | Zahm et al. | 355/41 |

FOREIGN PATENT DOCUMENTS

| | | |
|---|---|---|
| 2576118 | 1/1985 | France . |
| 63-189264 | 4/1988 | Japan . |
| 63-189262 | 4/1988 | Japan . |

OTHER PUBLICATIONS

Patent Abstracts of Japan, vol. 12, No. 39 (M–665) 5 Feb. 1988 & JP-A-62 191 162 (SEIKO) 21 Aug. 1987 * abstract only *.

*Primary Examiner*—Michael L. Gellner
*Assistant Examiner*—Daniel P. Malley
*Attorney, Agent, or Firm*—Townsend and Townsend and Crew

[57] ABSTRACT

An image printer includes a projection-exposure section for projecting an image born on a film onto a photosensitive material, an image-exposure section for exposing the photosensitive material based on image information comprised of a plurality of image areas each including color data relating to a plurality of colors, and a transport unit for transporting the photosensitive material through the projection-exposure section and the image-exposure section. The image-exposure section includes a plurality of exposure units for dividing the image information into a plurality of lines and exposing the photosensitive material with switching exposing colors corresponding to the plurality of color data, a moving device for moving the plurality of exposure units and the photosensitive material relative to each other in a direction perpendicular to the lines, and a moving-exposure control unit for controlling operations of the exposure units and the moving device. The exposure control unit is capable of effecting a moving exposure control in which the plurality of exposure units respectively effect exposure operations thereof in a parallel manner.

18 Claims, 8 Drawing Sheets

IMAGE PRINTER

BACKGROUND OF THE INVENTION

1. Field of the Invention

The present invention relates to an image printer, and more particularly to an image printer including a projection-exposure section for projecting an image born on a film onto a photosensitive material, an image exposure section for exposing the photosensitive material based on image information comprised of a plurality of image areas each including color data relating to a plurality of colors, and transport means for transporting the photosensitive material through the projection-exposure section and the image-exposure section.

2. Description of the Related Art

Such image printer as described above may be used for a variety of purposes. For instance, the printer allows the projection-exposure section and the image-exposure section to be utilized independently of each other. The printer is also usable for a multiple exposure operation. In this case, the projection-exposure section effects an exposure of the film image onto a certain portion of the photosensitive material and also the image-projection section effects a further overlapping exposure of another image onto the same portion of the photosensitive material while the photosensitive material is being transported by the transport means through the projection-exposure section and the image-exposure section.

Conventionally, the image-exposure section of the above-described image printer effects an exposure of a video image displayed on a CRT monitor onto the photosensitive material, the video image being comprised of a plurality of image areas each including color data relating to a plurality of colors.

According to the above conventional art, however, the image-exposure section including the CRT monitor tends to be large and complicated, such that it has been difficult to form the entire printer apparatus simple and compact. Thus, there remains room for improvement in this respect.

The present invention attends to the above-described state of the art. And, a primary object of the present invention is to provide an improved image printer which is compact and simple and which is superior in processing capacity through minimization of undesirable reduction in the speed of the image exposure operation.

SUMMARY OF THE INVENTION

For accomplishing the above-noted object, an image printer according to the present invention comprises:

a projection-exposure section for projecting an image born on a film onto a photosensitive material;

an image-exposure section for exposing the photosensitive material based on image information comprised of a plurality of image areas each including color data relating to a plurality of colors; and transport means for transporting the photosensitive material through the projection-exposure section and the image-exposure section;

wherein the image-exposure section includes;

a plurality of exposure means for dividing the image information into a plurality of lines and exposing the photosensitive material with switching exposing colors corresponding to the plurality of color data;

moving means for moving said plurality of exposure means and said photosensitive material relative to each other in a direction perpendicular to said lines, and moving-exposure control means for controlling operations of said exposure means and said moving means, said exposure control means being capable of effecting a moving exposure control in which said plurality of exposure means respectively effect exposure operations thereof in a parallel manner.

According to the above-described construction, depending on the necessity, the transport means transports the photosensitive material while the photosensitive material is being exposed at either one or both of the projection-exposure section and the image-exposure section.

In above, in the course of the exposure at the images-exposure section, the exposure operations by the plurality of exposure means are carried out in a parallel manner, i.e. the exposing operations with a plurality of exposing colors are effected simultaneously.

Incidentally, it is conceivable to provide a single exposure means capable of exposure operations with different exposing colors one after another with a switchover operation. Yet, in comparison with this construction, the construction of the present invention is advantageous for increasing the speed of the exposure operations since the exposure operations can be effected in the parallel manner.

The image-exposure section adapted for processing the image information in the form of the plurality of the divided lines can be formed more compact and simple then the conventional construction using a CRT which processes the entire image information. Further, the moving exposure control can minimize the reduction in the exposure processing speed. Accordingly, the invention has fully achieved the primary object of providing an improved image printer which is compact and simple and which is superior in processing capacity through minimization of undesirable reduction in the speed of the image exposure operation.

According to one aspect of the present invention, an image printer may be constructed as follows.

The plurality of the above-described exposure means includes a plurality of projection means for independently projecting onto the photosensitive material light components corresponding to the plurality of the exposing colors, and a plurality of exposure control units provided for the plurality of the respective projection means. And, the exposure control units include a plurality of exposure-control shutters operable to control the exposure of the photosensitive material with the plurality of projection units for each of a plurality of areas divided in a direction perpendicular to a direction of a relative movement between the exposure means and the photosensitive material. Further, the plurality of the exposure control units are disposed side by side in the direction of the relative movement in a vicinity of the transport path.

According to the above-described construction, as the plurality of exposure-control shutters are controlled independently of each other, the light from the exposure control units is caused to irradiate the photosensitive material to expose the same.

Incidentally, it is conceivable to dispose the exposure control units distantly from the transport path, with providing a plurality of optical fibers (to be referred to as irradiation optical fibers hereinafter) for guiding the light from the respective exposure-control shutters. Yet, the above-described construction is more convenient in that such optical fibers are not necessary.

According to a further aspect of the invention, the plurality of the exposure control units are arranged so as to expose a same single portion of the photosensitive material.

With this, the light emitted from the plurality of the exposure control units provided respectively for the plurality of exposing colors is caused to irradiate a same single portion of the photosensitive material to expose the same.

Specifically, in case the plurality of exposure control units provided respectively for the plurality of exposing colors are disposed so as to expose different portions of the photosensitive material, it is necessary to control the operations of the moving means and the respective exposure means so that the light of each exposing color corresponding to a same line may irradiate a same single portion of the photosensitive material. On the other hand, according to the above construction of the invention, such control operation is not necessary. Further, exposure with less color displacement is possible.

As a result, it has become possible to simplify the arrangement for controlling the moving means and the respective exposure means and further to achieve exposure with less color displacement. Thus, further cost reduction and higher-quality printing of image information onto the photosensitive material have become possible.

According to a still further aspect of the present invention, the optical paths for respectively guiding the light from the plurality of projection means to the plurality of the exposure means comprises optical fibers.

With the above arrangement, the light beams from the plurality of projection means are guided to the plurality of exposure control units, respectively.

That is, without the optical fibers for guiding the light from the plurality of projection means to the plurality of exposure means, it would be necessary to dispose the projection means and the exposure control means on a same optical axis, thereby to disadvantageously limit the disposing arrangement of the projection means and the exposure control means. However, according to the above-described construction of the present invention, without such limitation, flexibility is obtained in the disposing arrangement of the projection means and the exposure control means.

Incidentally, the arrangement of the optical fibers for exposure may be very simple so that the light beam from the single projection means may irradiate all of the plurality of the exposure-control shutters of the exposure control unit corresponding thereto. Thus, for example, precise positioning operation thereof is not necessary.

As a result, because of the flexibility in the disposing arrangement of the projection means and the exposure control units, the entire image printer may be formed further compact.

According to a still further aspect of the present invention, the exposure control unit includes a diffusing member for diffusing the light beam irradiated from the optical fibers, the diffusing member being positioned on the side of the optical fibers relative to the exposure-control shutters.

With the above-described construction, the light beam irradiated from the exposure optical fibers is diffused by the diffusing member to be irradiated to the the plurality of the exposure-control shutters, respectively. That is, since the light is uniformly irradiated onto the plurality of the exposure-control shutters, the amount of the light irradiated from each exposure-control shutter onto the photosensitive material may be uniform.

As a result, because of the uniformity of the amount of light irradiated from each exposure-control shutter onto the photosensitive material, even higher-quality of printing of the image information onto the photosensitive material becomes possible.

According to a still further aspect of the present invention, the light source constituting the projection means is disposed outside a casing for covering the transport passage.

With this construction in which the light source is disposed outside the casing for covering the transport passage, it is possible to avoid temperature rise inside the casing due to heat generation from the light source. That is to say, in case the light source is disposed inside the casing, a heat radiator means will be needed for discharging the heat from the light source to the outside of the casing. However, with the above-described characterizing construction of the invention, it is possible to reliably avoid the temperature rise inside the casing without such heat radiator means.

Then, the construction may effectively restrict disadvantageous variation in the sensitivity of the photosensitive material associated with the temperature rise.

Consequently, because of the capability of effectively restricting the disadvantageous variation in the sensitivity of the photosensitive material associated with the temperature rise without providing the heat radiator means, even higher-quality printing of the image information onto the photosensitive material is possible while achieving further cost reduction.

According to a still further aspect of the present invention, the image printer is constructed as follows.

The image-exposure section includes;

a projection means for projecting light onto the photosensitive material to expose the photosensitive material with switching over a plurality of exposing colors, the projection means including a plurality of projection units for projecting the plurality of exposing colors and a plurality of exposure-color control shutters for independently and selectively opening/closing a plurality of optical paths for guiding the light from the respective projection units to a plurality of exposure heads, the plurality of exposure heads controlling the exposing light from the projection means to the photosensitive material, with dividing the exposing light into a plurality of areas.

In the case of the above-described construction, the projection means includes a plurality of projection units for projecting the plurality of exposing colors and a plurality of exposure-color control shutters for independently and selectively opening/closing a plurality of optical paths for guiding the light from the respective projection units to a plurality of exposure heads. Then, through the independently and selective opening/closing of the exposure-color control shutters, the light beams of the plurality of exposing colors projected from the projection units are guided respectively to the exposure heads. Then, the light beam guided to the exposure head is divided into a plurality of areas by the plurality of exposure-control shutters provided inside the exposure head and then guided to the photosensitive material. Accordingly, the light beams of the exposing colors formed independently of each other may be guided in the independently manner to the same exposure-control shutter by controlling the opening/closing of the exposure-color control shutters.

As a result, since the light beams of the exposing colors formed independently of each other through the control of opening/closing of the exposure-color control shutters may be guided to the same exposure-control shutters, the same area may be exposed with each exposing color. This can avoid deterioration in the image quality due to erroneous displacement of the colors. Further, since the projections of the light beams of the respective exposing colors are controlled by means of the exposure-color control shutters, the construction of the projection means for projecting with switching over the exposing colors may be simple, and it becomes also possible to reduce the switchover time period of the exposing colors.

The above-described exposing-color control shutters are preferably electronic shutters.

With this, the light beams of the plurality of exposing colors projected from the plurality of projection units are guided to the exposure heads with the light beams being selected according to their colors by the electronics shutters acting as the exposure-color control shutters. Thus, the exposing colors may be switched over through the control of these electronic shutters.

In comparison with mechanical shutters, the electronic shutters are advantageous for less operation noise, easier control and also for reduced time period of exposure color switchover.

The optical paths for guiding the light beams from the plurality of projection units to the exposure heads may comprise optical fibers.

In the case of the above, the plurality of projection units may be disposed distantly from the exposure heads.

With such distant arrangement of the projection units from the exposure heads, it becomes possible to avoid variation in the sensitivity of the photosensitive material due to generation of heat from the projection units.

According to a still further aspect of the invention, a diffusing member for diffusing the light beam projected from the optical fiber is provided on the side of the optical fiber relative to the plurality of exposure-color control shutters.

With the above-described construction, the diffusing member for diffusing the light beam is disposed closer to the optical fiber than to the plurality of exposure-color control shutters. Then, the light beams of the plurality of exposing colors may be uniformly diffused by the diffusing member to be guided to the exposure-control shutters.

As a result, because of the uniform diffusion of the light beams of the plurality of exposing colors projected from the plurality of projection units and the subsequent guiding of the same to the exposure-control shutters, it is possible to render further uniform the light beam to be guided to the exposure-control shutters, thereby to achieve further improvement in the image quality.

Further and other objects, features and effects of the invention will become apparent from the following more detailed description of the embodiments of the invention with reference to the accompanying drawings.

DESCRIPTION OF THE PREFERRED EMBODIMENTS

Preferred embodiments of an image printer relating to the present invention will be detailed next with reference to the accompanying drawings.

Figure 1:
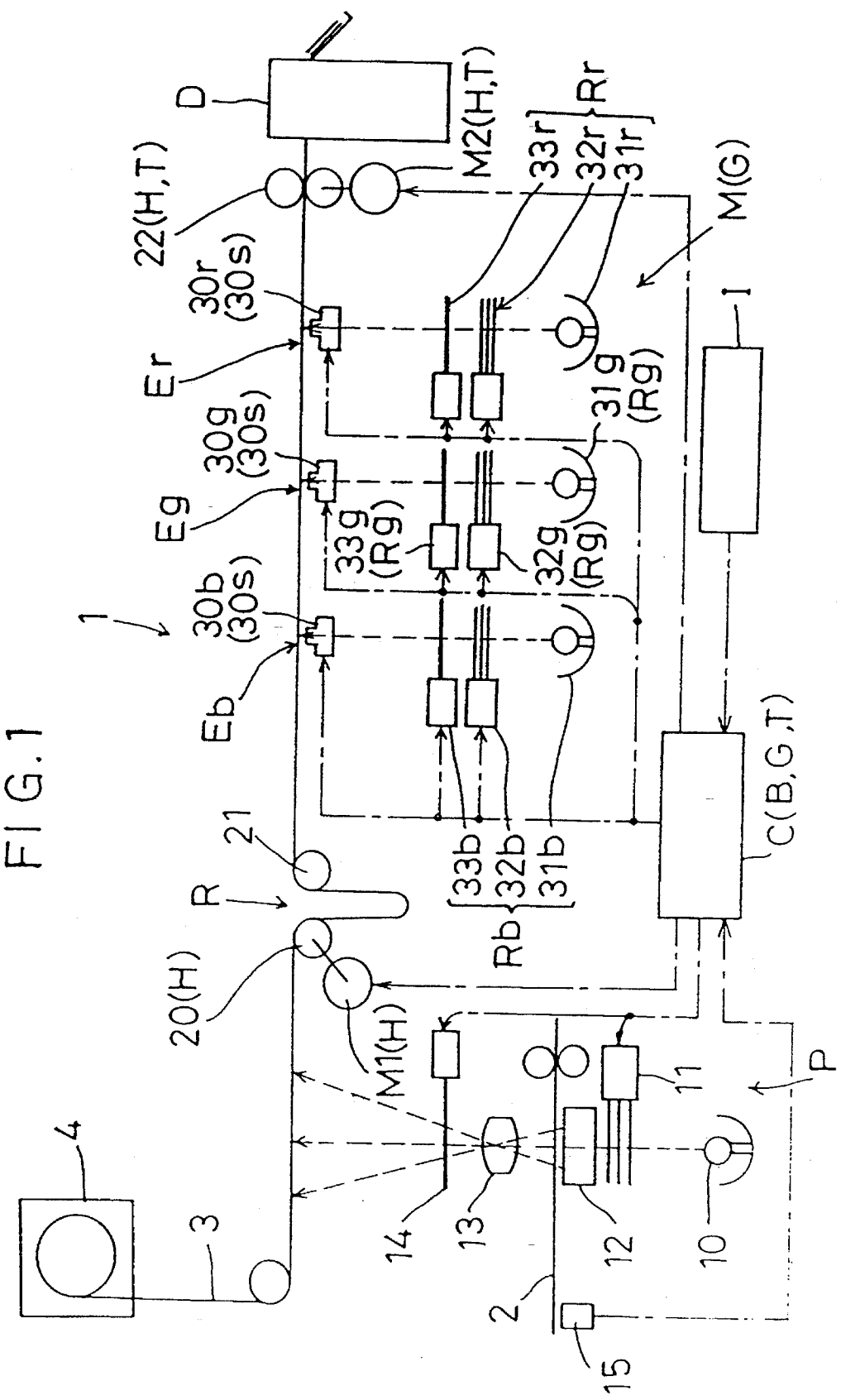
FIG. 1 is a schematic construction view of an image printer according to one preferred embodiment of the present invention.

As shown in FIG. 1, an image printer 1 includes a projection-exposure section P for projecting/exposing image information of a film 2 onto a print paper 3 as a photosensitive material, a moving exposure section M for dividing image information into a plurality of lines and then exposing one line after another onto the print paper 3, a loop forming unit R for forming a loop of the print paper 3 in order to adjust a difference between a processing speed at the projection-exposure section P and a processing speed at the moving exposure section M, a developing section D for developing the print paper 3 having been exposed at either one or both of the projection-exposure section P and the moving exposure section M, and a control unit C for controlling the above-described components of this image printer 1.

The print paper 3 withdrawn from a print-paper holder 4 in which the print paper 3 is accommodated in a rolled condition is exposed at either one or both of the projection-exposure section P and the moving exposure section M. Then, this print paper 3 is developed at the developing section D and cut into a sheet including image information of one film frame amount.

Next, the respective components will be described.

The projection-exposure section P includes a projection-exposure light source 10, a light-modulating filter 11 for adjusting color balance of light to be irradiated onto a film 2, a mirror tunnel 12 for uniformly mixing light color components having passed through the light-modulating filter 11, a printing lens 13 for printing an image on the film 2 onto the print paper 3, and a shutter 14, with all these components being aligned along a common optical axis. Further, at an upstream position on a transport path of the film 2, there is disposed an image sensor 15 for reading color density information of the image-bearing area of the film 2.

At the projection-exposure section P, the color density information of the image-bearing area of the film 2 is read by the image sensor 15. Then, based on this color density information, the control unit C controls the light-modulating filter 11 to adjust the irradiating light beam from the projection-exposure light source 10 to a color balance corresponding to the color density of the image on the film 2. And, with this adjusted light beam, the film 2 is irradiated thereby to expose the image on the film 2 onto the print paper 3.

The loop forming unit R includes rollers 20, 21 for transporting the print paper 3 and a motor M1 for rotatably driving the roller 20. Further, between the roller 20 disposed on the upstream side in the print paper transport direction and the further roller 21 disposed on the downstream side in the print paper transport direction, though not shown, there is provided a flap switchable between a state for guiding the print paper 3 in a straight manner between the rollers 20, 21 and a further state for allowing the print paper 3 to be formed into a loop as shown in FIG. 1. In case of the double-exposure at both the projection-exposure section P and the moving exposure section M, such loop is formed of the print paper 3 in order to adjust a difference between processing speeds at the two exposure sections P, M.

The moving exposure section M includes red projection means Rr, green projection means Rg, blue projection means Rb for respectively projecting light beams corresponding to red, green and blue exposing colors and a red exposure control unit 30r, a green exposure control unit 30g and a blue exposure control unit 30b provided for the three projection means Rr, Rg and Rb, respectively.

The projections means Rr, Rg, Rb will be described next, respectively.

The red projection means Rr includes a light source 31r, a light-modulating filter 32r for adjusting the exposing color and a shutter 33r. Similarly, the green projection means Rg includes a light source 31g, a light-modulating filter 32g and a shutter 33g. And, the blue projection means Rb includes a light source 31b, a light-modulating filter 32b and a shutter 33b.

The red exposure control unit 30r will be described more specifically next.

The red exposure control unit 30r, though not shown, includes a plurality of exposure control shutters 30 for controlling the exposure of the print paper 3 with the light beam from the red projection means Rr for each of a plurality of areas divided in a direction perpendicular to the transport direction of the print paper 3.

Though not shown, the exposure control shutter 30 includes a PLZT element having a pair of electrodes, with the element being interposed between a polarizer and an analyzer. Then, by varying a voltage to be impressed between the pair of electrodes, the polarizing direction of the light passing between the electrodes is varied so as to selectively allow or inhibit passage of the light. More specifically, a plurality of assemblies each including a PLZT element with the pair of electrodes and a polarizer and an analyzer opposed to each other across the PLZT element are juxtaposed in the direction perpendicular to the transport direction of the print paper 3, thereby to constitute this red exposure control unit 30r.

The green exposure control unit 30g and the blue exposure control unit 30b too have similar constructions as that of the red exposure control unit 30r.

The red exposure control unit 30r, the green exposure control unit 30g and the blue exposure control unit 30b are disposed one after another with a predetermined distance therebetween in the transport direction of the print paper 3 in the vicinity of the transport passage of the print paper 3, so as to expose the print paper 3 with the light passing through these respective units.

The light source 31r, the light-modulating filter 32r, the exposure-color control shutter 33r and the red exposure control unit 30r are disposed along a same optical axis, thereby to constitute a red exposure means Er for exposing the print paper 3 with a red light. Similarly, the light source 31g, the light-modulating filter 32g, the exposure-color control shutter 33g and the green exposure control unit 30g are disposed along a same optical axis, thereby to constitute a green exposure means Eg for exposing the print paper 3 with a green light. Further, the light source 31b, the light-modulating filter 32b, the exposure-color control shutter 33b and the blue exposure control unit 30b are disposed along a same optical axis, thereby to constitute a blue exposure means Eb for exposing the print paper 3 with a blue light.

That is, by independently controlling the voltages to be impressed to the plurality of PLZT elements in the red exposure means Er, green exposure means Eg and the blue exposure means Eb, respectively, a color printing of one line amount of the image information divided into the plurality of areas is effected onto the print paper 3.

On the downstream side of the print paper transport passage at the moving exposure section M, there are provided a roller 22 for transporting the print paper 3 and a pulse motor M2 for driving the roller 22.

The developing section D, though not shown, includes a plurality of tanks filled with processing liquids for developing the exposed print paper 3, so that the print paper 3 may be developed through its successive passage through the plurality of tanks.

The control unit C stores a program for controlling the respective components and an image information read by an image reader or generated by means of the art of computer graphics or the like and inputted to the unit.

Each of the above-described red exposure control means Er, the green exposure control means Eg and the blue exposure control means Eb is for effecting an exposure of the exposing color for each one line amount of the image information divided into the plurality of areas. Therefore, in order to print the entire image information onto the print paper 3, the print paper 3 must be transported in synchronism with the exposure at each exposure means Er, Eg, Eb.

Next, control operations effected by the control unit C for the above purpose will be described.

Figure 2:
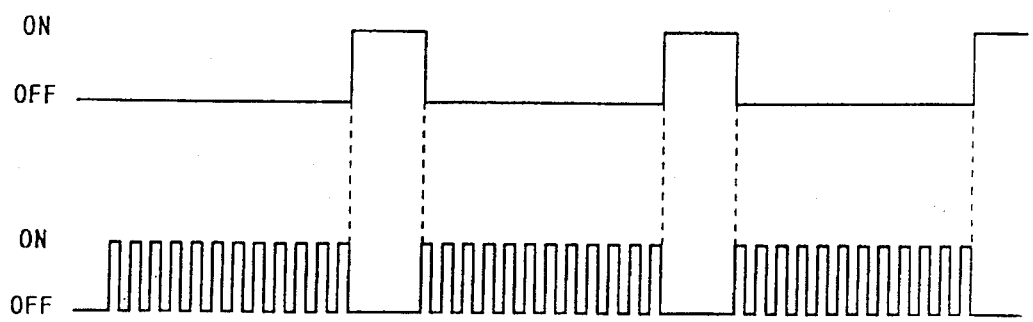
FIG. 2 is a timing chart relating to the embodiment of FIG. 1, FIGS. 3(a), (b), (c) are views showing examples of printed conditions relating to the embodiment of FIG. 1.

As shown in FIG. 2, after transmission of a driving signal to the pulse motor M2 is stopped to stop this pulse motor M2, signals to the respective exposure-color control shutters 33r, 33g, 33b are rendered 'ON' to open these exposure-color control shutters 33r, 33g, 33b. Simultaneously, as will be described more particularly later, one line amount of exposure operation is initiated at each of the exposure means Er, Eg, Eb. Then, with completion of the exposures after lapse of a predetermined time period, the signals to the respective exposure-color control shutters 33r, 33g, 33b are rendered 'OFF', thereby to close these exposure-color control shutters 33r, 33g, 33b. Simultaneously, the driving signal is transmitted to the pulse motor M2 for a predetermined time period to activate this pulse motor M2 thereby to transport the print paper 3 by a length corresponding to the one line amount. These processes are repeatedly carried out.

Next, with reference to FIG. 3, exposure control operations effected respectively by the red exposure means Er, green exposure means Eg and the blue exposure means Eb will be described.

The red exposure means Er, the green exposure means Eg and the blue exposure means Eb are disposed side by side along the transport direction of the print paper 3 with a predetermined distance corresponding to an 'n' line amount therebetween.

Figure 3A:
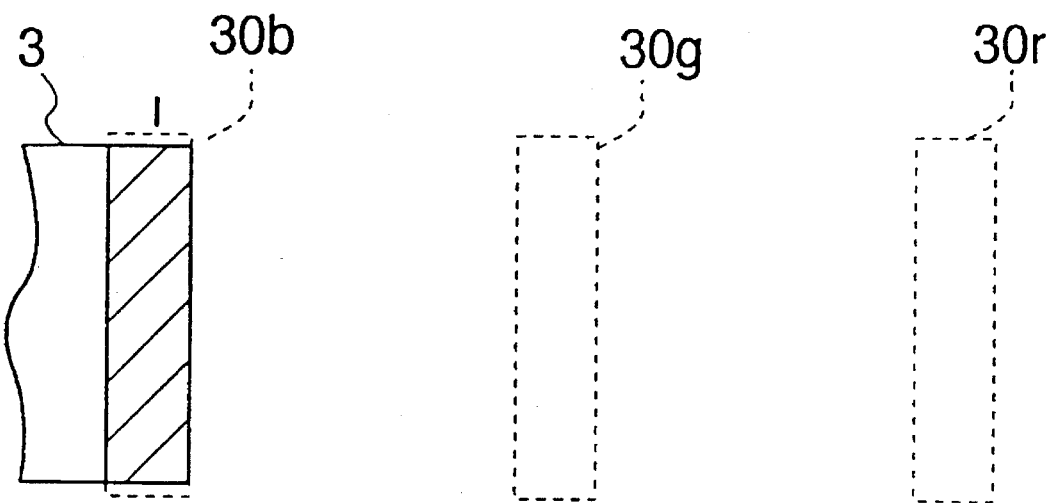

First, as shown in FIG. 3(a), when a portion of the print paper 3 corresponding to the first line is transported to the exposing position of the blue exposure means Eb, based on the image information concerning the blue component of the first line of the entire image information stored at the control unit C, voltages to be impressed to the respective PLZT electrodes of the blue exposure control unit 30b are controlled to expose the first-line information onto the print paper 3. Then, in the like manners, the information of the second line, third line . . . n+1 line is exposed one after another.

Figure 3B:
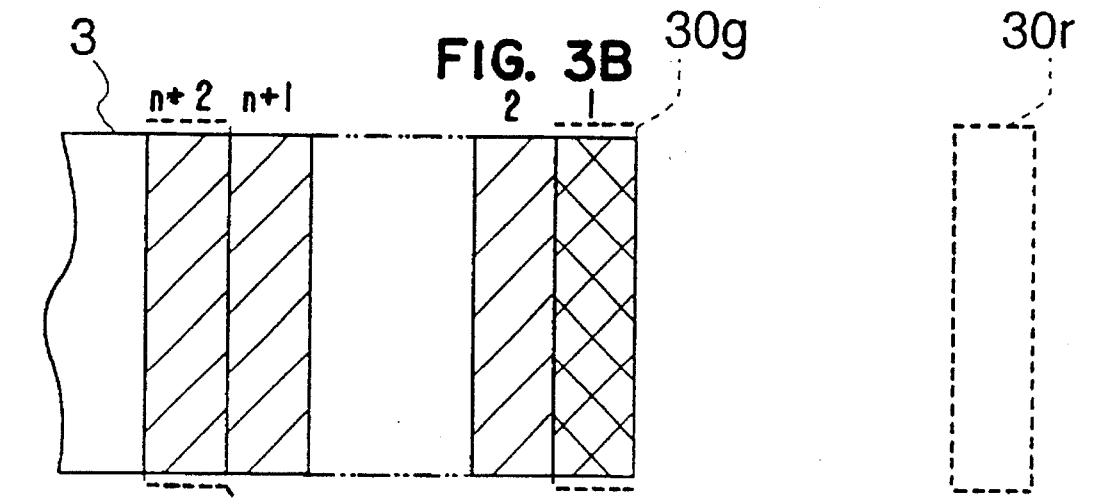
Figure 3C:
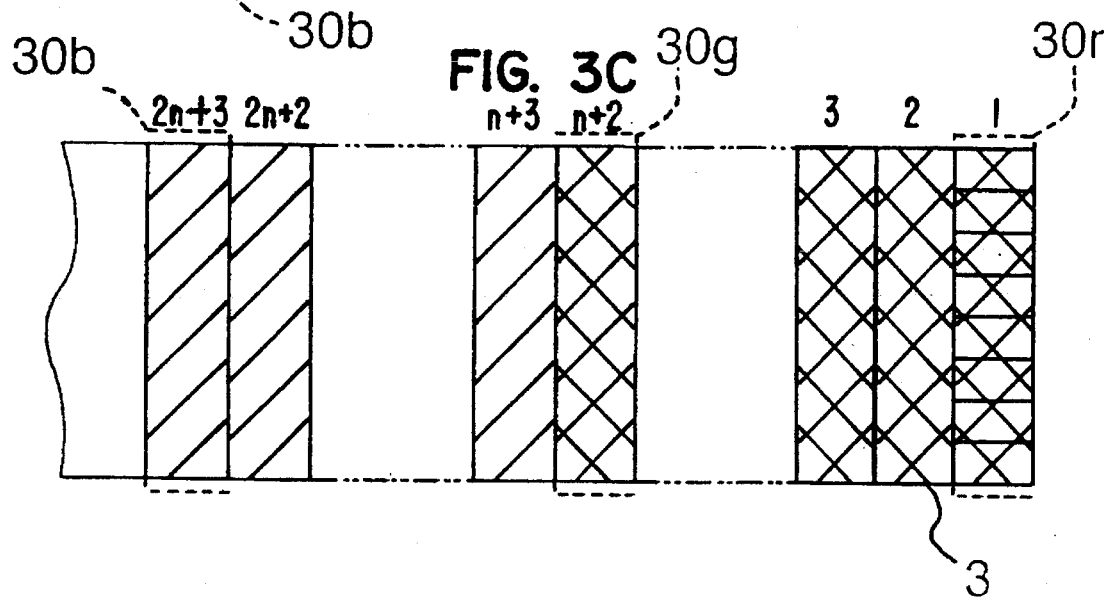

Next, as shown in FIG. 3(b), when the portion of the print paper 3 corresponding to the first line is transported to the exposing position of the green exposure means Eg, based on the image information concerning the green component of the first line of the entire image information stored at the control unit C, voltages to be impressed to the respective PLZT electrodes of the green exposure control unit 30g are controlled to expose the first-line information onto the print paper 3.

In like manners, at the blue exposure means Eb, based on the image information of the blue component of the n+2 line portion of the entire image information stored at the control unit C, the voltages to be impressed to the respective PLZT electrodes of the blue exposure control unit 30b are controlled to expose the n+2 line portion onto the print paper 3.

Thereafter, in the similar manners, at the green exposure means Eg and the blue exposure means Eb, (the second line and n∓line), (the third line and n+4 line) . . . (n+1 line and 2n+2 line) portions are exposed in series.

When a portion of the print paper 3 corresponding to the first line portion is transported, based on the image information of the red component of the first line portion of the entire image stored at the control unit C, the voltages to be impressed to the respective PLZT electrodes of the red exposure control unit 30r are controlled to expose the first line portion onto the print paper 3.

In like manners, at the green exposure means Eg, based on the image information of the green component of the n+2 line portion of the entire image information stored at the control unit C, the voltages to be impressed to the respective PLZT electrodes of the green exposure control unit 30g are controlled to expose the n+2 line portion onto the print paper 3. And, at the blue exposure means Eb, based on the image information of the blue component of the n+2 line portion of the entire image information stored at the control unit C, the voltages to be impressed to the respective PLZT electrodes of the blue exposure control unit 30b are controlled to expose the n+2 line portion onto the print paper 3. With these, as to the first line portion, the entire printing operations of the respective color components of the image information are completed.

Thereafter, in the similar manners, at the red exposure means Er, the green exposure means Eg and the blue exposure means Eb, (the second line, n∓line and 2n+4 line), (the third line, n+4 line and 2n+5 line) . . . portions are exposed in series, thereby to print one-frame amount of the image information.

Incidentally, this image printer 1 is designed to be switchable between a composite image mode in which the image on the paper exposed at the projection-exposure section P is double-exposed with a further image at the moving exposure section M and a further mode in which either one of the projection-exposure section P and the moving exposure section M is utilized alone. This mode switching operation is effected from an input device I connected to the control unit C.

Accordingly, the control unit C and the moving exposure section M together function as an image-exposure section G for exposing the print paper 3 based on image information comprised of a plurality of image areas each including color data relating to a plurality of colors. The rollers 20, 22, the motor M1 and the pulse motor M2 together function as transport means H for transporting the print paper 3 through the projection-exposure section P and the image-exposure section S.

The roller 22, the pulse motor M2 and the control unit C together function as moving means T for causing the plurality of exposure means Er, Eg, Eb and the print paper 3 to be moved relative to each other in a direction perpendicular to the divided lines. Further, the control unit C functions as moving exposure of the plurality of exposure means Er, Eg, Eb and of the moving means T.

Some other embodiments of the invention will be described next.

(1) In the foregoing embodiment, the print paper 3 is employed as the photosensitive material. Instead, a positive film or any other photosensitive material such as a photosensitive drum used in e.g. a photocopier apparatus may be employed.

Figure 4:
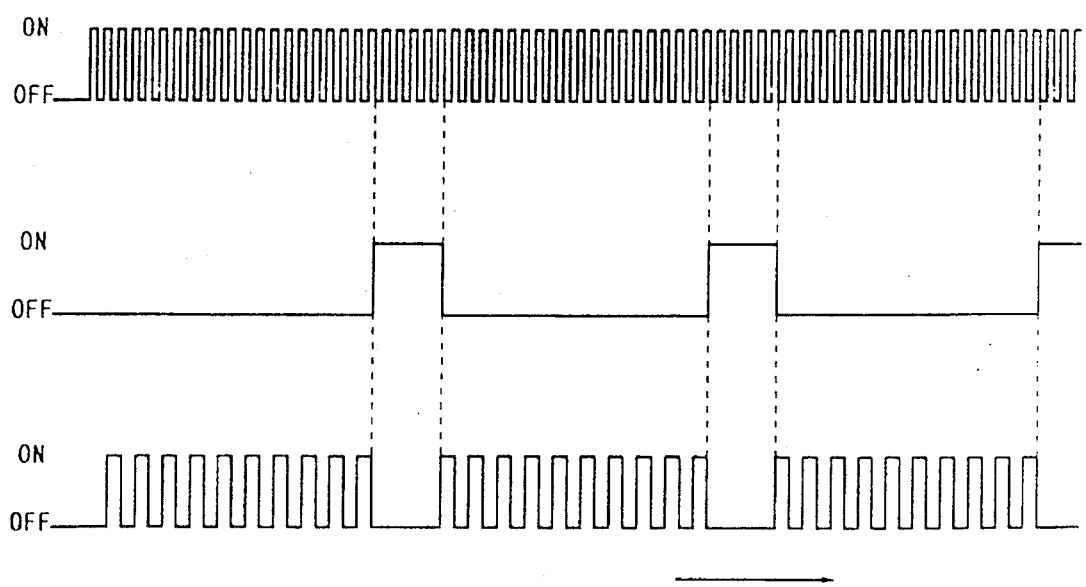
FIG. 4 is a timing chart relating to a further embodiment of the present invention.

(2) As shown in FIG. 4, it is conceivable to control operation timings of the exposure means Er, Eg, Eb and the moving means T based on clock signals.

(3) In the foregoing embodiment, the exposure control shutters 30S comprise the light shutters using PLZT elements. Instead, for instance, light shutters comprised of liquid crystal elements may be employed.

Figure 5:
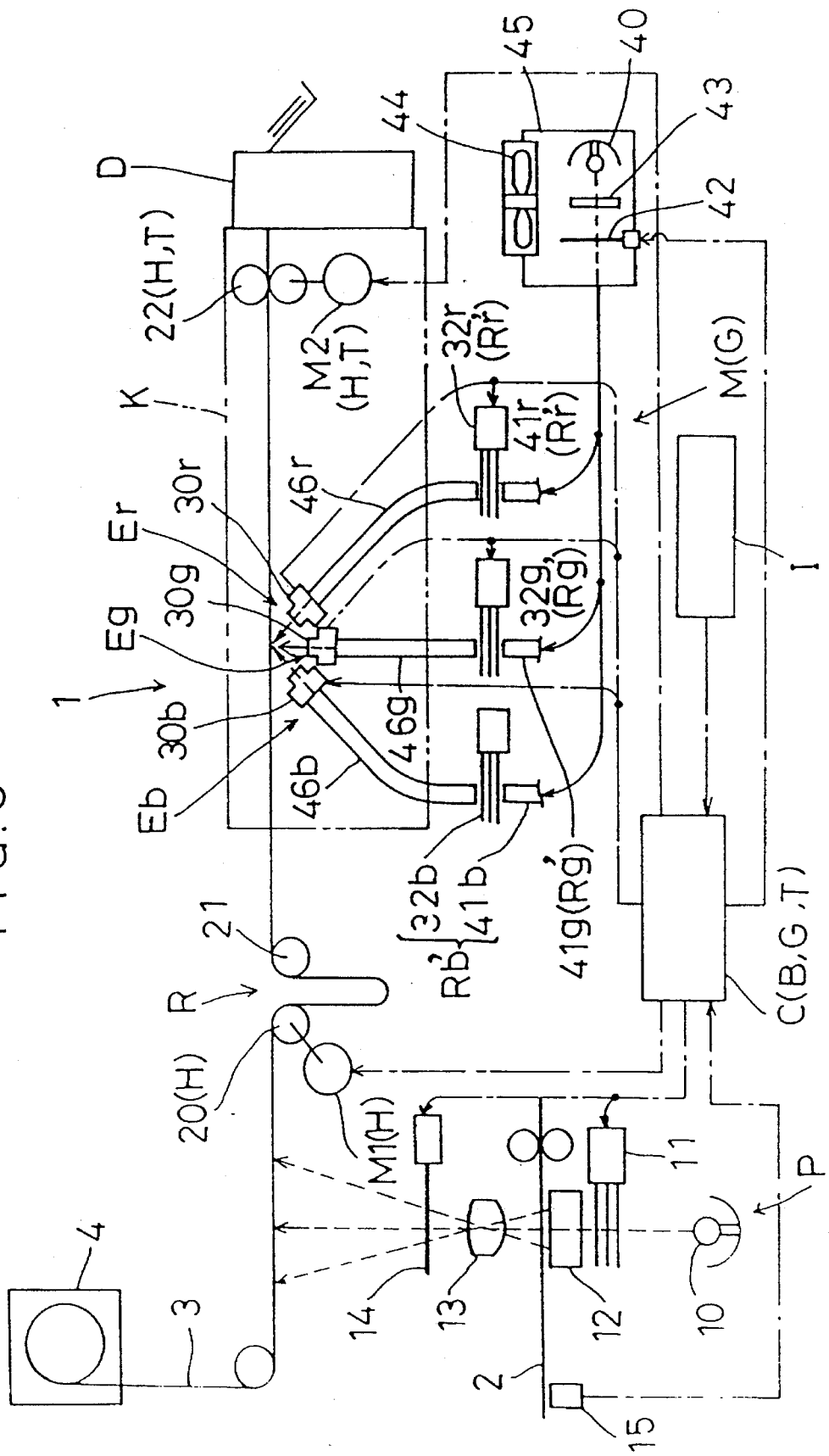
FIG. 5 is a schematic construction view of an image printer according to a still further embodiment of the present invention.

(4) A further embodiment will be described with reference to FIG. 5.

In this embodiment, same components as those employed in the embodiment of FIG. 1 are denoted with the same reference marks and will not be described here.

A casing K is provided for covering the transport passage of the print paper 3. The red exposure control unit 30r, the green exposure control unit 30g and the blue exposure control unit 30b are disposed inside the casing K so as to expose a same portion of the print paper 3.

The light from the light source 40 is guided via optical fibers 41r, 41g, 41b to light-modulating filters 32r, 32g, 32b, respectively. A reference numeral 42 in the drawing denotes a shutter. That is, red projection means Rr' includes the light source 40, the shutter 42, the optical fiber 41r and the light-modulating filter 32r. Green projection means Rg includes the light source 40, the shutter 42, the optical fiber 41g and the light-modulating filter 32g. Further, blue projection means Rb includes the light source 40, the shutter 42, the optical fiber 41b and the light-modulating filter 32b. Namely, the single light source 40 acts as the common light source for the respective projection means Rr', Rg, Rb. A reference numeral 43 denotes an IR cut filter and a numeral denotes a cooling fan 44. Incidentally, the light source 40, the shutter 42, the IR cut filter 43 and the cooling fan 44 are housed inside a casing 45. Further, this casing 45 is disposed outside the casing K.

Optical fibers 46r, 46g, 46b are operable to guide the light beam from the red projection means Rr', the green projection means Rg and the blue projection means Rb respectively to the red exposure control unit 30r, the green exposure control unit 30g and the blue exposure control unit 30 disposed inside the casing K. That is to say, the optical paths for guiding the light beams from the red projection means Rr', the green projection means Rg, the blue projection means Rb respectively to the red exposure control unit 30r, the green exposure control unit 30g and to the blue exposure control unit 30b are formed by the optical fibers 46r, 46g, 46b, respectively.

Figure 6:
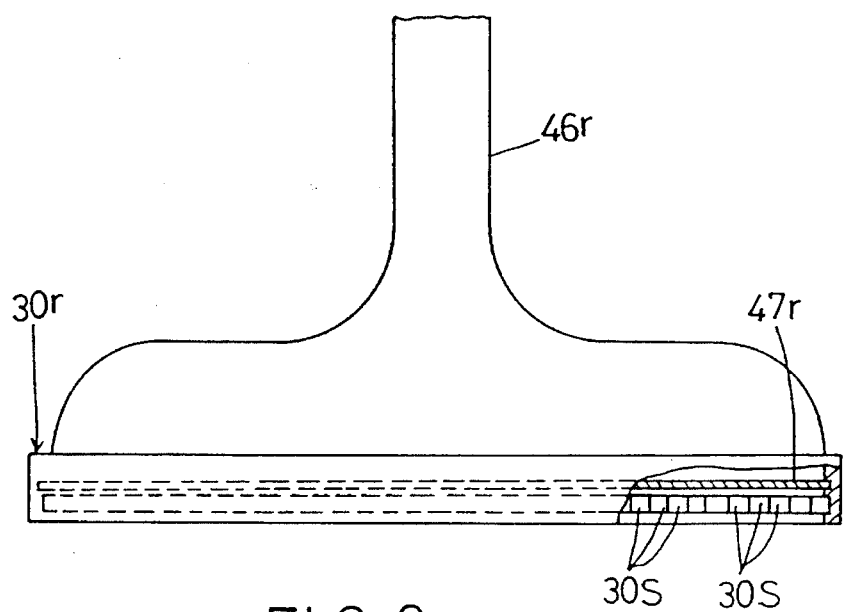
FIG. 6 is a partially cutaway view showing an exposure control unit relating to the embodiment of FIG. 5.

Further, as shown in FIG. 6, the red exposure control unit 30r includes a diffusing member 47r for diffusing the light projected from the optical fiber 46r, with the diffusing member 47r being disposed closer to the optical fiber 46r than to the plurality of exposure control shutters 30S. Also, though not shown, like the diffusing member 47r provided in the red exposure control unit 30r, the green exposure control unit 30g is provided with a diffusing member 47g, and the blue exposure control unit 30b is provided with a diffusing member 47b, respectively. Moreover, though not shown, each of the optical fibers 46r, 46g, 46b comprises a bundle of a plurality of optical fibers arranged in line.

Accordingly, the red projection means Rr', the optical fiber 46r and the red exposure control unit 30r together constitute the red exposure control means Er. The green projection means Rg, the optical fiber 46g and the green exposure control unit 30g together constitute the green exposure control means Eg. Further, the blue projection means Rb, the optical fiber 46b and the blue exposure control unit 30b together constitute the blue exposure control means Eb.

Then, at the red exposure means Er, the green exposure means Eg, and the blue exposure means Eb, the exposure operations of the red, green and blue components of the same line are effected in a parallel manner.

(5) A still further embodiment will be described next.

Figure 7:
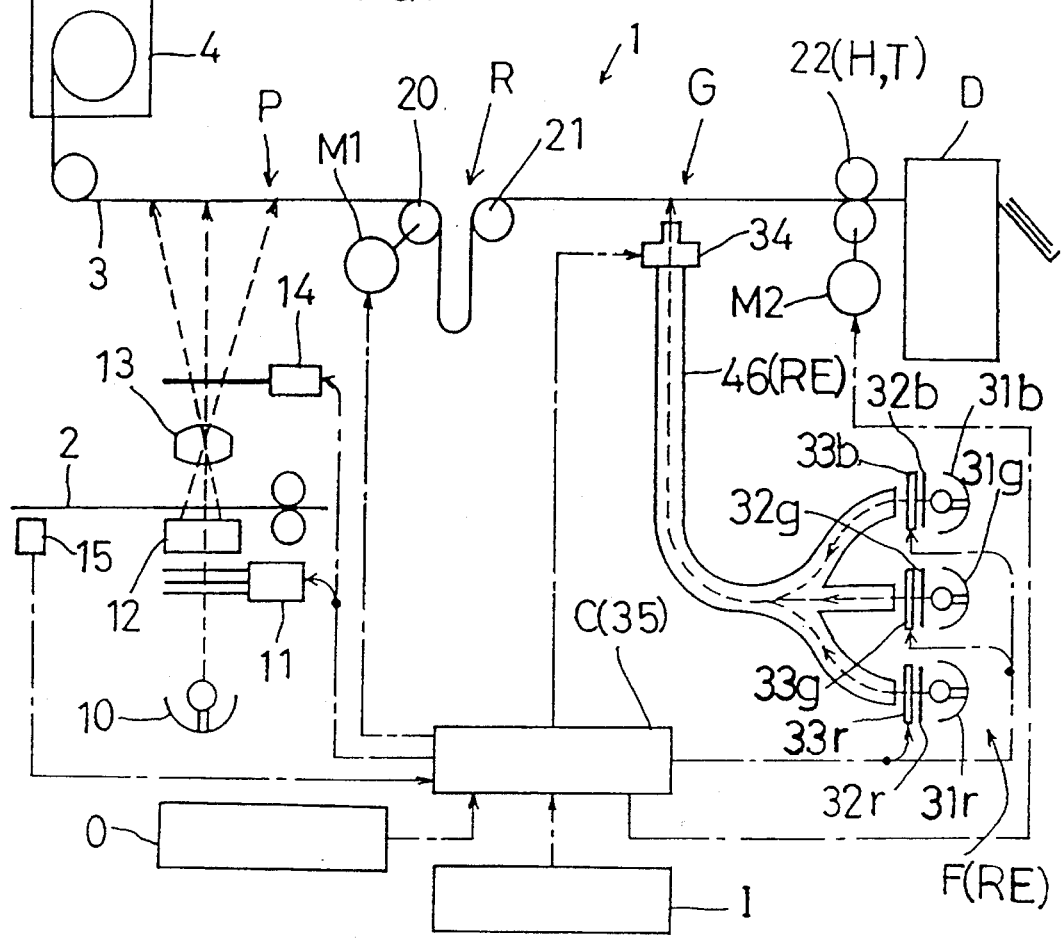
FIG. 7 is a schematic construction view of an image printer according to a still further embodiment of the present invention.
Figure 8:
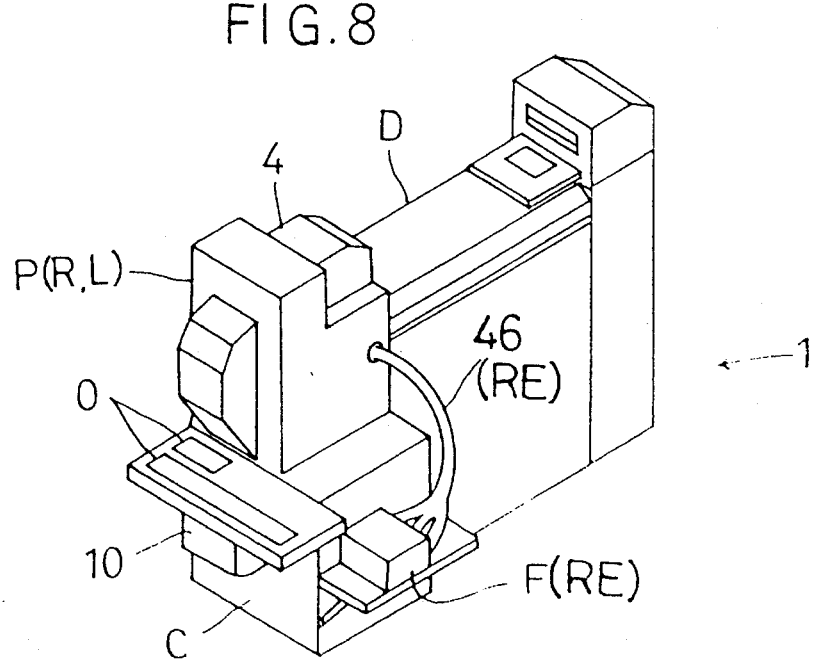
FIG. 8 is a perspective view of the image printer of FIG. 7.

In this further embodiment, as shown in FIGS. 7 and 8, this image printer 1 includes the projection-exposure section P for projection/exposing the image information of the film 2 onto the print paper 3 as the photosensitive material, the image-exposure section G for dividing into lines image information to be exposed onto the print paper 3 and exposing each line onto the same, the loop forming unit R for forming the loop of the print paper 3 in order to effect the transport of the print paper 3 at the projection-exposure section P and that at the image-exposure section G independently of each other, the developing section D for developing the print paper 3 having been exposed at either the projection-exposure section P or the image-exposure section G, and the control unit C for controlling the above-described components of this image printer 1. The control unit C is connected to the input device I for inputting the image information and also to a control panel O for effecting a variety of mode setting operations and instruction inputting operations.

The print paper 3 having been withdrawn form the print-paper holder 4 in which the print paper 3 is accommodated in the rolled state is exposed at either one or both of the projection-exposure section P and the image-exposure section G; then, this print paper 3 is developed through the developing section D to be discharged therefrom, with the print paper 3 being cut into a paper piece containing one-frame amount of image information.

The image printer 1 provides two modes of a projection-exposure mode and an image-exposure mode. In the projection-exposure mode, the image of the film 2 is exposed onto the print paper 3 only at the projection-exposure section P. In the image-exposure mode, the print paper 3 is exposed at the image-exposure section alone. The selection of one of these two modes to be executed is done by inputting an instruction from the control panel O. Further, the image composing exposure utilizing both of these two modes is possible.

Through the instruction input from the control panel O, it is selected which image information is to be exposed in the image-exposure mode, i.e. selection between the image information inputted by the input device I and the image information of the film 2 read in a manner to be described later, or selection of composite image using both of the two kinds of image information.

The projection-exposure section P includes the projection-exposure light source 10, the light-modulating filter 11 for adjusting color balance of light to be irradiated onto the film 2, the mirror tunnel 12 for uniformly mixing light color components having passed through the light-modulating filter 11, the printing lens 13 for printing an image on the film 2 onto the print paper 3, and the shutter 14, with all these components being aligned along a common optical axis.

On the upstream side in the film transport path of the film 2 at the projection-exposure section P, there is provided the image sensor 15 acting as a reader means for reading the image information of the film 2 with the image information being divided into a great number of areas. This image sensor 15 is operable to irradiate white light onto the film 2 and measuring, by e.g. a CCD line sensor, intensity of its reflected or transmission light, with the light being decomposed into three primary colors of red, green and blue. Then, the image information read by the image sensor 15 is utilized for both the exposure at the projection-exposure section P and the exposure at the image-exposure section L.

At the projection-exposure section P, based on the image information of the film 2 read by the image sensor 15, the control unit C controls the light-modulating filter 11 to adjust the irradiating light of the projection-exposure light source 10 to a color balance according to the color densities of the image of the film 2, so that this adjusted light is irradiated onto the film 2 to print the image of the film 2 onto the print paper 3.

The loop forming unit R includes the rollers 20, 21 for transporting the print paper 3 and the motor M1 for rotatably driving the roller 20. Between the roller 20 on the upstream side of the transport direction of the print paper and the roller 21 on the downstream side of the transport direction of the print paper, though not shown, there is disposed a flap switchable between a condition for guiding the print paper 3 between the rollers 20, 21 in a straight manner and a further condition for allowing the print paper 3 to be formed into a loop. Then, with formation of the loop, it is possible to set a transport speed of the print paper 3 at the projection-exposure section P and a transport speed of the same at the image-exposure section G, independently of each other.

Figure 9:
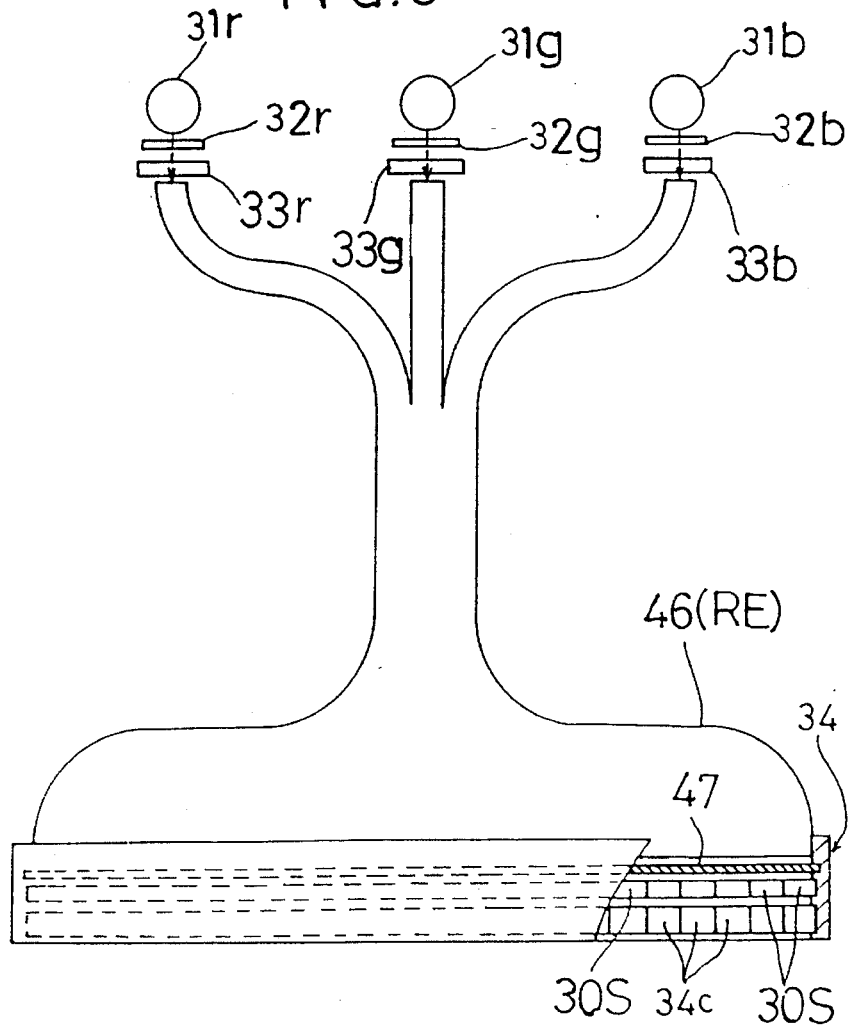
FIG. 9 is a view showing constructions of a projection means and exposure head of FIG. 7.

As shown in FIGS. 7 and 9, projection means RE is comprised of three projection units F for respectively projecting the three primary colors, an optical fiber bundle 46 for respectively guiding the light beams from the projection units F to the exposure head 34, and of three exposure-color control shutters 33r, 33g, 33b for opening/closing the optical paths to the optical fiber bundle 46 according to the colors.

Incidentally, the three projection units F include three light sources 31r, 31g, 31b and red, green and blue color filters 32r, 32g, 32b. In operation, as the light beams projected from the light sources 31 pass the color filters of the respective colors, three kinds of exposing colors (red, green, blue) are produced.

The exposure head 34 includes a diffusing member 47 for diffusing the light projected from the optical fiber bundle 46, a plurality of exposure-control shutters 30S for opening/closing the light from this diffusing member 47 with the light being divided into a plurality of areas, and a SELFOC (registered trade mark of Nippon Sheet Glass Co., Ltd.) lens alley 34c for converging the respective light beam components opened/closed through the exposure-control shutters 30S on the print paper 3. The exposure-control shutters 30S and the SELFOC lens alley 34c are linearly disposed in the direction perpendicular to the transport direction of the print paper 3.

Accordingly, the plurality of exposure-control shutters 30S are operable to control the exposure of the print paper 3 with the light beams from the projection means RE with the light being divided into a plurality of areas.

Figure 11:
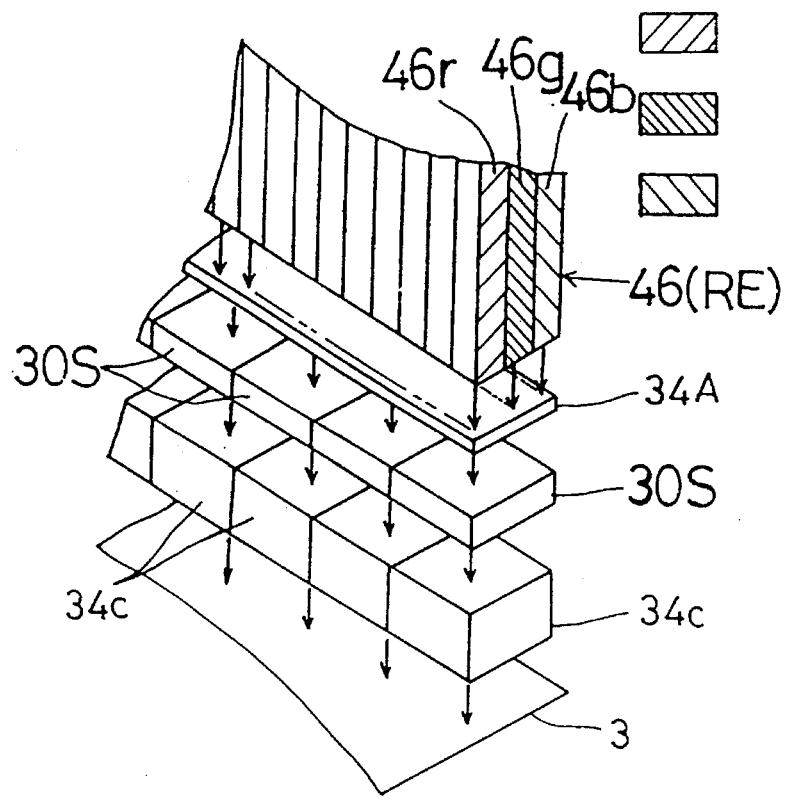
FIG. 11 is a view showing connection between an optical fiber and an exposure head of FIG. 7.

Incidentally, the light beams of the respective colors (red 46r, green 46g, blue 46b) guided by the optical fiber bundle 46 are projected to the exposure head 34 according to an order illustrated in FIG. 11.

Each of the exposure-control shutters 33r, 33g, 33b and of the exposure-control shutters 30S, though not shown, is comprised of PLZT element interposed between a polarizer and an analyzer. Then, by varying the voltage to be impressed between a pair of electrode attached to each PLZT element, the polarizing direction of the light passing between the electrodes is varied so that the PLZT element allows or inhibits passage of the light therethrough. In this way, these shutters function as electronic shutters.

Accordingly, as the voltages to be impressed to the respective PLZT elements of the three exposure-color control shutters 33r, 33g, 33b to switch over the exposing color to one of the three primary colors of red, green and blue and also the voltages to be impressed to the PLZT elements of the exposure-control shutters 30S, exposure of one-line amount of the image information divided into a plurality of areas is effected for each area by an exposure amount corresponding to its exposing color.

That is to say, while the exposure head 34 is exposing the one-line amount of the image information, the exposure-color control shutters 33r, 33g, 33b are opened and closed one time in series, thereby to exposure all of the three primary colors.

The exposure-control shutters 30S are adapted to be opened and closed in synchronism with the exposure-color control shutters 33r, 33g, 33b. For instance, when the projection means RE projects a blue light beam, the opening time period (exposure time period) of each of the exposure-control shutters 30S is varied depending on the density of the blue component to be exposed of each area. That is, the higher the density, the longer time period the shutter is opened.

On the downstream side of the print paper transport passage at the image-exposure section G, there are provided the roller 22 for transporting the print paper 3 and the motor M2 for driving this roller 22. Then, the roller 22, the motor M2 together with the roller 20 and the motor M1 constitute the transport means H.

Under the control of the control unit C, at the image-exposure section G, as the one-line amount of image information is exposed in series onto the print paper 3 with switching over the exposing color, the roller 22 is driven by the motor M2 to transport the print paper 3 by a distance corresponding to the one-line amount. Then, as these operations are repeated with shifting the image information by one line amount at each time, the print paper 3 is exposed with the entire one-frame amount of the image information.

The developing section D, though not shown, includes the plurality of tanks filled with processing liquids for developing the exposed print paper 3, so that the print paper 3 may be developed through its successive passage through the plurality of tanks.

The input device I comprises an image scanner for scanning and reading various kinds of image information with the information being divided into a plurality of areas. Then, the read information is converted into density information of the three primary colors of red, green and blue and then transmitted to the control unit C.

The control unit C includes a memory 35 for storing the program for controlling the respective components, and various kinds of image information such as the image information inputted form the input device I and the image information read by the image sensor 15.

Figure 10:
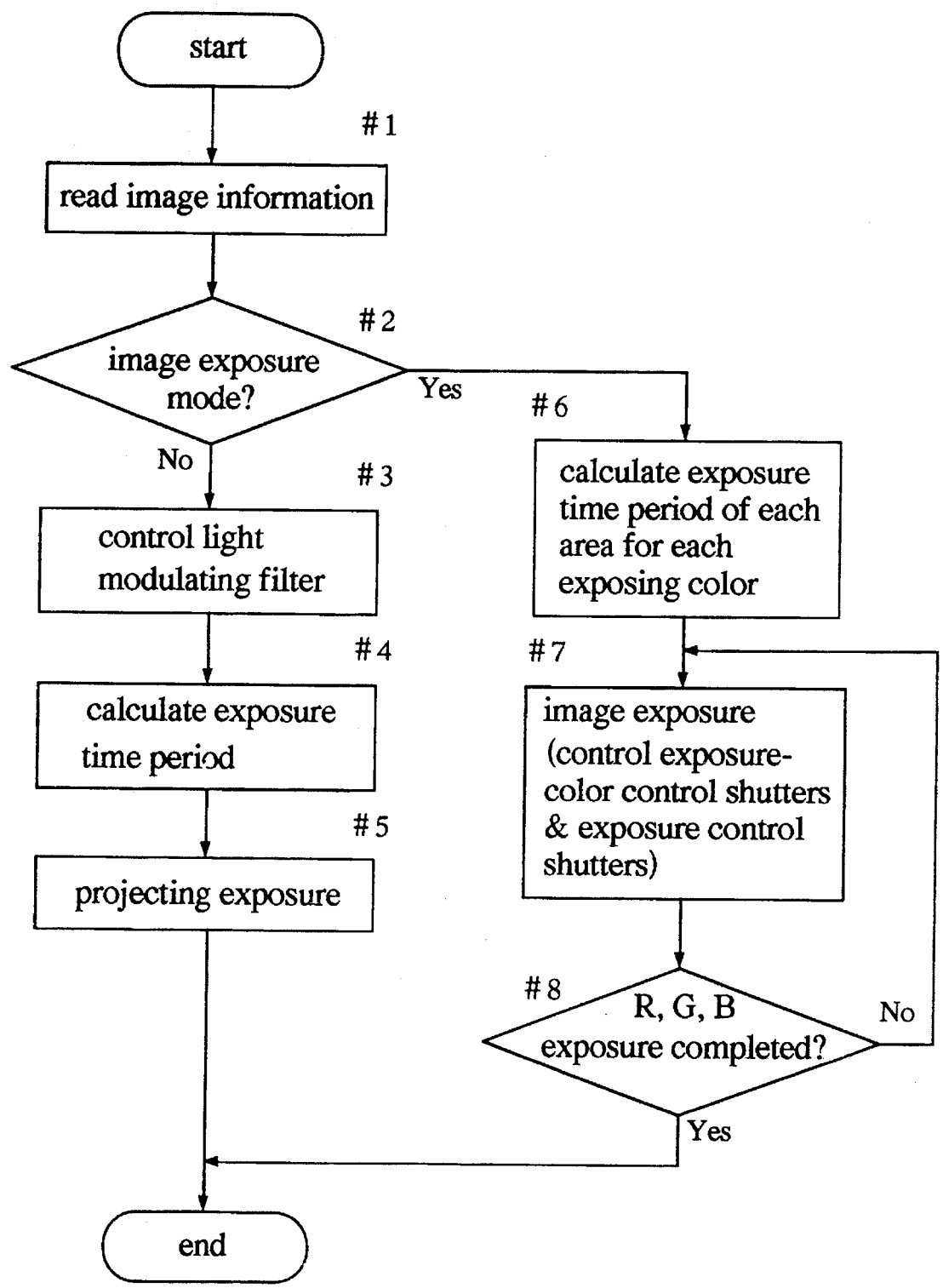
FIG. 10 is a flow chart relating to the embodiment of FIG. 7.

Next, the control scheme effected by the control unit for controlling the operations of the respective components will be described with reference to the flow chart of FIG. 10.

First, the image sensor 15 reads the image information of the film 2 introduced into the projection-exposure section P as color density information of the three primary colors of red, green and blue (step #1). In this, if the film 2 comprises a negative film, the read density information concerning the three primary color components need to be converted into density information of complementary colors of the respective color components.

then, it is judge whether the operation mode of the image printer 1 is presently set to the image-exposure mode or the projection-exposure mode (step #2). If the mode is set to the projection-exposure mode, by utilizing the image information obtained at step #1, the light-modulating filter 11 is controlled to be adjusted for the optimal color balance (step #3).

Thereafter, by utilizing the image information of step #1, the exposure time period is calculated (step #4). Then, based on the result of calculation of the exposure time period, the shutter 14 is activated to expose the print paper 3 (step #5).

On the other hand, if it is judged at step #2 that the operation mode is presently set to the image-exposure mode, the exposure time periods for the respective color components of the respective areas are calculated (step #6). Then, based on the results of these calculations, the exposure-color control shutters 33r, 33g, 33b and the exposure-control shutters 30S are controlled to effect an image exposure (step #7). This image exposure under the controls of the exposure-color control shutters 33r, 33g, 33b and the exposure-control shutters 30S is effected for each of the three primary color components of red(r), green (g) and blue (b) (step #8), thereby to complete the image exposure of one-line amount of the image information. Incidentally, though not described in the flow chart, an image exposure of one-frame amount of the image information is completed after the above-described one-line image exposure operation is effected for a predetermined number of lines.

By utilizing both of the projection-exposure mode and the image-exposure mode, a composite image may be exposed at the image-exposure section G by e.g. double-exposing the image or character data inputted by the input device I on the portion of the print paper having been exposed by the projection-exposure of the film image.

(6) In the foregoing embodiment, the light beams of three colors (red 46r, green 46g, blue 46b) are used for the exposure. The colors are not limited to these kinds; for instance, a light beam of any other color may be used for the exposure. It is also conceivable to add a further exposure means of any other color of e.g. orange.

Figure 12:
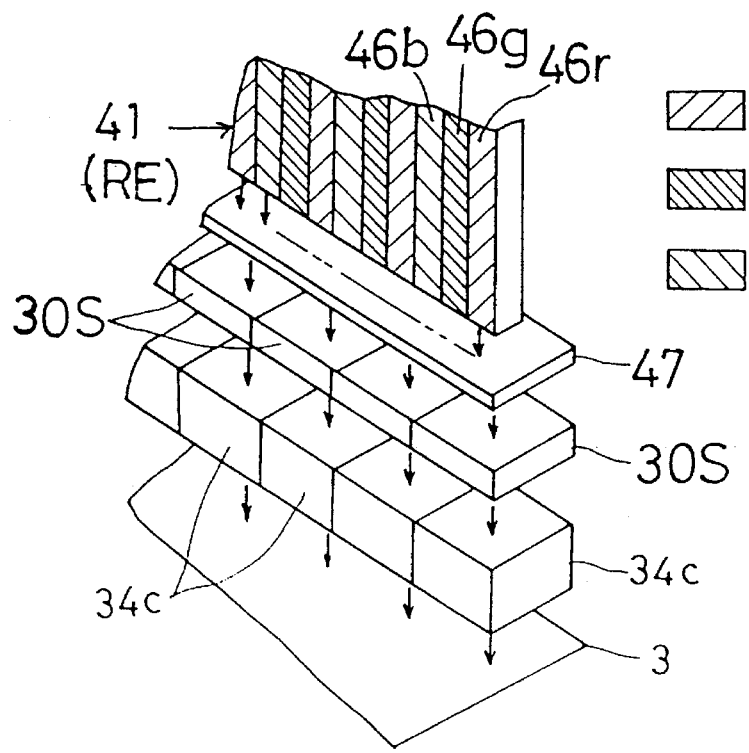
FIG. 12 is a view showing connection between an optical fiber and an exposure head relating to a still further embodiment of the present invention.

(7) In the foregoing embodiment, the light beams of the respective colors (red, green, blue) guided by the optical fiber bundle 46 are projected to the exposure head 34 in the order illustrated in FIG. 11. Instead, these beams may be projected to the exposure head 34 according to a further order illustrated in FIG. 12. That is, what is essential here is that the optical fiber bundle 46 and the exposure head 34 are so connected to each other to allow the light beams projected from the optical fiber bundle 46 to be uniformly diffused by the diffusing member 47. The arrangement that each of the three optical fibers for guiding the three light beams of three colors corresponds to each of the exposure-control shutters 30S is not absolutely necessary.

(8) In the foregoing embodiment, the exposure-color control shutters 33r, 33g, 33b and the exposure-control shutters 30S comprise the electronic shutters using PLZT elements. Instead, mechanical shutters as employed in a photographic camera may be used.

9) In the foregoing embodiment, at the image-exposure section G, the light beams from the respective projection units F are guided to the exposure head 34 by means of the optical fiber bundle 46. Alternatively, the light beams from the projection units F may be directly converged onto the exposure heads by means of lenses. Further, the light beams from the projection units F may be converged by e.g. lenses and then this converged light may be guided to the exposure head 34 by means of the optical fiber bundle 46. In this case, the diffusing member 47 provided inside the exposure head 34 may be eliminated.

(10) In the foregoing embodiment, when the print paper 3 is exposed at the image exposure section G, the one-line amount exposure operation and the line-line amount of transporting operation of the print paper 3 are repeated in the alternate manner, thereby to expose the each line of the image information. Instead, a further arrangement is conceivable in which the exposure operations of the respective lines of the image information are effected one after another while the print paper 3 is being transported in a continuous manner at a predetermined speed.

(11) In the foregoing embodiment, during the one-line exposure by the exposure head 34, the exposure-color control shutters 33r, 33g, 33b are opened and closed for one time respectively in series, thereby to expose all of the three primary colors. Yet, in case the exposure time periods of the respective colors are the same through the entire areas, i.e. in case the densities of the respective colors are constant through the entire areas, the exposure-color control shutters 33r, 33g, 33b of the respective colors may be opened and closed at the same time, thereby to expose all the colors at one time.

(12) In the foregoing embodiment, the respective exposure-control shutters 30S are adapted to vary their opening time periods (i.e. exposure time periods) depending on the densities to be exposed for each area. Instead, the exposure time periods may be varied by changing the number of times of opening of the same.

The invention may be embodied in other specific forms without departing from the sprit or essential characteristics hereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An image printer comprising:

a projection-exposure section for projecting an image born on a film onto a photosensitive material;

an image-exposure section for exposing the photosensitive material based on image information obtained from said film, said image information comprising a plurality of image areas each including color data relating to a plurality of colors; and transport means for transporting the photosensitive material along a transport path through the projection-exposure section and the image-exposure section;

wherein said image-exposure section includes:

a plurality of exposure means for dividing the image information into a plurality of lines and exposing the photosensitive material with exposing colored light according to the color data;

moving means for moving said plurality of exposure means and said photosensitive material relative to each other in a direction perpendicular to said lines, and moving-exposure control means for controlling operations of said exposure means and said moving means, said exposure control means being capable of effecting a moving exposure control in which said plurality of exposure means respectively effect exposure operations thereof in a parallel manner.

2. An image printer as defined in claim 1, wherein said plurality of exposure means includes:

a plurality of projection means for independently projecting onto the photosensitive material light components corresponding to the exposing colored light, and a plurality of exposure control units provided for the plurality of the respective projection means, said plurality of exposure control units being arranged so as to expose a same single portion of the photosensitive material.

3. An image printer as defined in claim 2, wherein the image-exposure section comprises optical fibers for respectively guiding the exposing colored light from the plurality of projection means to the plurality of the exposure control units.

4. An image printer as defined in claim 3, wherein each said exposure control unit includes an exposure control shutter and a diffusing member for diffusing the exposing colored light irradiated from said optical fibers, said diffusing member being positioned between the optical fibers and the exposure-control shutters.

5. An image printer as defined in claim 2, wherein said transport means includes a transport passage passing by the projection means, said image exposure section includes a casing enclosing said transport passage, and said projection means comprises a light source disposed outside said casing.

6. An image printer as defined in claim 1, wherein said plurality of exposure means include:

a plurality of projection means for independently projecting onto the photosensitive material light components corresponding to the exposing colored light, a plurality of exposure control units provided for the plurality of the respective projection means, a plurality of exposure-control shutters provided for said plurality of exposure control units and operable to control the exposure of the photosensitive material by the exposing colored light from said plurality of projection means for each of a plurality of areas divided in a direction perpendicular to a direction of a relative movement between said exposure means and said photosensitive material, said plurality of exposure control units being disposed side by side in the direction of the relative movement in a vicinity of the transport path.

7. An image printer as defined in claim 6, wherein said plurality of exposure control units are arranged so as to expose a same single portion of the photosensitive material.

8. An image printer as defined in claim 7, wherein the image-exposure section comprising optical fibers for respectively guiding the exposing colored light from said plurality of projection means to the plurality of the exposure control units.

9. An image printer as defined in claim 8, wherein each said exposure control unit includes an exposure control shutter and a diffusing member for diffusing the exposing colored light irradiated from said optical fibers, said diffusing member being positioned between the optical fibers and the exposure-control shutters.

10. An image printer as defined in claim 9, wherein said transport means includes a transport passage passing by the projection means, said image exposure said projection means comprises a light source disposed outside said casing.

11. An image printer comprising:
   a projection-exposure section for projecting an image born on a film onto a photosensitive material;
   an image-exposure section for exposing the photosensitive material based on image information, obtained from said film, said image information comprising a plurality of image areas each including color data relating to a plurality of colors; and
   transport means for transporting the photosensitive material along a transport path through the projection-exposure section and the image-exposure section;
   wherein said image-exposure section includes:
      a projection means for projecting light onto the photosensitive material to expose the photosensitive material with exposing colored light, the projection means including a plurality of projection units for projecting the plurality of exposing colored light and a plurality of exposure-color control shutters for independently and selectively opening/closing a plurality of optical paths for guiding the exposing colored light from the respective projection units to a plurality of exposure heads,
      said plurality of exposure heads controlling the exposing colored light from the projection means to the photosensitive material, with dividing the exposing colored light into a plurality of areas.

12. An image printer as defined in claim 11, wherein said exposing-color control shutters are electronic shutters.

13. An image printer as defined in claim 11, wherein said image exposure section comprises optical fibers for guiding said exposing colored light and a diffusing member, positioned between the optical fibers and the plurality of exposure-color control shutters, for diffusing the exposing colored light.

14. An image printer as defined in claim 11, wherein said image exposure sections comprises optical fibers for guiding the light beams from the plurality of projection units to the exposure heads.

15. An image printer as defined in claim 13, wherein a diffusing member for diffusing the exposing colored light beam projected from the optical fibers is disposed closer to the optical fibers than to the plurality of exposure-color control shutters.

16. An image printer comprising:
   an image-exposure section for exposing a photosensitive material based on image information comprised of a plurality of image areas each including color data relating to a plurality of colors, said image-exposure section including projection means for projecting exposing colored light onto the photosensitive material to expose the photosensitive material; and
   a plurality of exposure heads for controlling the exposure of the photosensitive material with the exposing colored light from said projection means, with the exposing colored light being divided into a plurality of areas;
   wherein said projection means includes a plurality of projection units for guiding respective light beams of a plurality of colors of the exposing colored light to said exposure heads and a plurality of exposure-color control shutters for independently and selectively opening/closing a plurality of optical paths for guiding the light beams from the projection units to the plurality of exposure heads respectively.

17. An image printer as defined in claim 16, wherein said exposing-color control shutters are electronic shutters.

18. An image printer as defined in claim 16, wherein each said exposure head includes a diffusing member for diffusing the light beams, a plurality of exposure-control shutters for blocking/passing the diffused light from said diffusing member with the diffused light being divided into a plurality of areas, and a lens alley for converging the diffused light passed through the exposure-control shutters onto said photosensitive material.

* * * * *